Patented Oct. 29, 1935

2,018,678

UNITED STATES PATENT OFFICE 2,018,678

ISOMERIZATION OF RUBBER

Walter Eastby Lawson, Woodbury, N. J., assignor to E. I. du Pont de Nemours & Company, Wilmington, Del., a corporation of Delaware No Drawing. Application April 11, 1934, Serial No. 720,153

6 Claims. (Cl. 260—1)

This invention relates to the art of treating rubber and more particularly to methods for forming thermoplastic compositions from rubber.

The invention has as an object the preparation of thermoplastic composition derived from rubber and hydrogen fluoride. A further object is the preparation of molding compositions. A still further object is the provision of a new, convenient and economical process whereby a thermoplastic composition may be obtained from rubber. Other objects will appear hereinafter.

This object is accomplished by the following invention, wherein rubber is reacted in solution with anhydrous hydrogen fluoride whereby the rubber is isomerized and a thermoplastic product is obtained.

It has been found that anhydrous hydrofluoric acid, when mixed with a solution of rubber in a solvent, causes a rapid isomerization of rubber with the formation of a thermoplastic composition which may be molded under the action of heat and pressure.

The following examples of the invention are included for purposes of illustration and are not to be regarded as limitative.

Example 1

Thirty grams of pale crepe rubber which had been milled for thirty minutes was dissolved in 270 grams of benzene. The solution was cooled to 10° C. in a copper reaction vessel equipped with a stirrer. To this solution was added 18 grams of anhydrous hydrofluoric acid, the mixture being stirred and the temperature rising to 23° C. After stirring the rubber solution with the acid for six minutes, the reaction mixture was poured into ethyl alcohol. The isomerized rubber which precipitated was broken up into small pieces, washed several times with alcohol, and finally with water and dried in an oven at 65° C. After washing the product free from hydrofluoric acid there was obtained 28 grams of a white solid material which was thermoplastic and resistant to even boiling water, not softening or dissolving therein. This could be molded by the use of elevated temperatures and pressures, for example 1500 pounds pressure and a temperature of 160° C.

Example 2

Thirty grams of 30-minute milled pale crepe rubber was dissolved in 270 grams of a mixture of aliphatic hydrocarbon boiling at 150° to 200° C. and the solution was cooled to 10° C. in a copper reaction vessel equipped with a stirrer. To this solution was added 18 grams of anhydrous hydrofluoric acid, the mixture being stirred and the temperature rising. After stirring the rubber solution with the acid for six minutes, the reaction mixture was poured into ethyl alcohol. The product which was precipitated was broken up into small pieces, washed several times with alcohol, and finally with water and dried in an oven at 65° C. There was obtained 28 grams of a white solid material readily molded under the influence of heat and pressure.

Example 3

Thirty grams of milled rubber which had been purified from protein constituents by benzene extraction was dissolved in 270 grams of benzene and the process of Example 1 followed. The product which was obtained was capable of being molded under the influence of heat and pressure, the molded product being a hard, light-brown and translucent composition.

For the successful carrying out of the process of the present invention an intimate contact of the hydrofluoric acid with the rubber solution is necessary. The reaction is exceedingly rapid and occurs practically simultaneously with the addition of acid, heat being evolved. It is therefore advantageous to cool the rubber solution to a temperature below the boiling point of the hydrofluoric acid before addition thereof so that loss of the acid by volatilization will be at a minimum.

The method of preparation of thermoplastic compositions from rubber and anhydrous hydrofluoric acid according to the process of the present invention is capable of variation from the conditions above given. Rubber solvents other than those mentioned, such as toluene, ethylbenzene, xylene, tetrahydronaphthalene, decahydronaphthalene, cyclohexane, chlorobenzene, carbon bisulfide, chloroform and other saturated or unsaturated aromatic or aliphatic hydrocarbon and chlorinated hydrocarbon solvents for rubber may be used. The proportion of hydrofluoric acid may be varied the preferred proportions being from 1.5 to 2.5 moles of hydrogen fluoride per isoprene unit. However, satisfactory molding products may be obtained, using as low as about 1 mole hydrogen fluoride per isoprene unit. In general at least equivalent amounts are necessary to produce thermoplastic products in a short time of contact. Products from the isomerization of rubber by contact with less than one mole of hydrogen fluoride per isoprene unit of the rubber are soft and sticky and suitable in adhesives.

Steam distillation of the product after reaction may be employed instead of precipitation to effect removal of the rubber solvent.

Other forms of rubber may be employed in this reaction such as partially hydrogenated rubber, untreated crude rubber, gutta percha, balata, etc. It is preferred, however, to use milled pale crepe rubber as the starting material.

The process of the present invention is advantageous for many reasons including the rapidity of the conversion of the rubber to a thermoplastic composition which may be readily molded under the influence of heat and pressure. The process may also readily be worked at temperatures of 25° C. or lower, resulting in a heat economy. The molded products are very water resistant and do not soften or discolor in boiling water. The product is a true thermoplastic material which, after it has once been molded, may be broken up and remolded.

The process has further advantages in the simplified handling of hydrofluoric acid, in the avoidance of corrosion difficulties of the rubber handling equipment, and in the lessening of the health hazard of the fumes from hydrogen fluoride.

The thermoplastic compositions resulting from the processes of the present invention may be used advantageously as molding compositions in the manufacture of articles for electric insulation, novelties, and the like.

The above description and examples are intended to be illustrative only. Any modification of or variation therefrom which conforms to the spirit of the invention is intended to be included within the scope of the claims.

I claim:

1. Process which comprises isomerizing rubber dissolved in an inert organic solvent therefor by adding thereto anhydrous hydrofluoric acid.

2. Process for the preparation of thermoplastic compositions which comprises isomerizing rubber dissolved in an inert organic solvent therefor by bringing the solution in contact with at least one mole of anhydrous hydrofluoric acid (as such) per isoprene unit of the rubber.

3. Process for the preparation of thermoplastic compositions which comprises isomerizing rubber dissolved in an inert organic solvent therefor by bringing the solution in contact with from 1.5 to 2.5 moles of anhydrous hydrofluoric acid (as such) per isoprene unit of the rubber.

4. Process for the preparation of thermoplastic compositions which comprises isomerizing rubber dissolved in an aromatic hydrocarbon solvent by bringing the solution in contact with at least one mole of anhydrous hydrofluoric acid (as such) per isoprene unit of the rubber.

5. Process for the preparation of thermoplastic compositions which comprises isomerizing rubber dissolved in an aromatic hydrocarbon solvent by contact with from 1.5 to 2.5 moles of anhydrous hydrofluoric acid (as such) per isoprene unit of the rubber.

6. Process for the preparation of thermoplastic compositions which comprises isomerizing one part of rubber dissolved in approximately nine parts of benzene at a temperature between 10° C. and 25° C. by contact with approximately two-thirds part of anhydrous hydrofluoric acid for approximately six minutes, precipitating the isomerized rubber by means of ethyl alcohol, freeing the precipitate from impurities by washing, and drying the resultant product.

WALTER EASTBY LAWSON.

DISCLAIMER 2,018,678.—*Walter Eastby Lawson*, Woodbury, N. J. ISOMERIZATION OF RUBBER. Patent dated October 29, 1935. Disclaimer filed May 17, 1937, by the assignee, *E. I. du Pont de Nemours and Company*.

Hereby enters this disclaimer to claims 3, 4, and 5 of said specification.
[*Official Gazette June 8, 1937.*]